United States Patent
Barrett et al.

(10) Patent No.: US 11,627,417 B2
(45) Date of Patent: Apr. 11, 2023

(54) VOICE INTERACTIVE SYSTEM

(71) Applicant: Expensify, Inc., San Francisco, CA (US)

(72) Inventors: David M. Barrett, San Francisco, CA (US); Robert Chen, San Francisco, CA (US)

(73) Assignee: Expensify, Inc., San Francisco, CA (US)

( * ) Notice: Subject to any disclaimer, the term of this patent is extended or adjusted under 35 U.S.C. 154(b) by 18 days.

(21) Appl. No.: 17/208,154

(22) Filed: Mar. 22, 2021

(65) Prior Publication Data
US 2021/0306762 A1    Sep. 30, 2021

Related U.S. Application Data

(60) Provisional application No. 63/000,372, filed on Mar. 26, 2020.

(51) Int. Cl.
*H04R 1/46* (2006.01)
*H04R 19/04* (2006.01)
(Continued)

(52) U.S. Cl.
CPC .............. *H04R 19/04* (2013.01); *G10L 15/22* (2013.01); *H04R 1/08* (2013.01); *H04R 1/1058* (2013.01);
(Continued)

(58) Field of Classification Search
CPC .............. H04R 2420/07; H04R 25/554; H04R 2225/55; H04R 2460/13; H04R 2499/11;
(Continued)

(56) References Cited

U.S. PATENT DOCUMENTS 7,664,277 B2 * 2/2010 Abolfathi ................ H04R 1/46
                                                            381/151
7,810,750 B2 * 10/2010 Abreu .................... G02C 5/143
                                                         351/159.75
(Continued)

FOREIGN PATENT DOCUMENTS

WO    WO-2019/163538        8/2019

OTHER PUBLICATIONS

International Search Report and the Written Opinion of the International Searching Authority dated Feb. 7, 2021, for related PCT/US2021/023837 filed Mar. 24, 2021, 10 pages.

*Primary Examiner* — Ryan Robinson
(74) *Attorney, Agent, or Firm* — Mahamedi IP Law LLP

(57) ABSTRACT

An interactive system can utilize microtechnology (e.g., a micro-electromechanical system (MEMS)), such as miniaturized microphone (e.g., a bone-conducting microphone), audio output device, microprocessor, and signal conversion and propagation means to create a personal area network (PAN) for a user. The system can include a voice input device (e.g., worn on one or more teeth of the user) that outputs a near-field magnetic induction (NFMI) signal based on a whisper input by the user. The NFMI signal is either detected by the user's mobile device, or converted into a wireless signal (e.g., a Bluetooth RF signal) detectable by the user's mobile device, for receiving voice commands (e.g., to provide personal assistant services) via a designated application running on the mobile device.

20 Claims, 5 Drawing Sheets

(51) Int. Cl.
*G10L 15/22* (2006.01)
*H04R 1/08* (2006.01)
*H04R 1/14* (2006.01)
*H04R 1/10* (2006.01)

(52) U.S. Cl.
CPC .......... *H04R 1/14* (2013.01); *G10L 2015/223* (2013.01); *H04R 2201/003* (2013.01); *H04R 2460/13* (2013.01)

(58) Field of Classification Search
CPC ......... H04M 2250/02; H04M 2250/74; H04M 1/6066; G10L 2015/225; G10L 2015/223
See application file for complete search history.

(56) References Cited

U.S. PATENT DOCUMENTS

| | | | |
|---|---|---|---|
| 8,977,255 B2 * | 3/2015 | Freeman | H04M 1/72412 455/425 |
| 9,563,299 B2 * | 2/2017 | Atsumi | G06F 1/1643 |
| 9,860,370 B2 * | 1/2018 | Yao | H04W 76/14 |
| 9,866,966 B2 * | 1/2018 | Lott | H04S 1/005 |
| 9,913,302 B2 * | 3/2018 | Parkinson | H04L 65/762 |
| 10,477,294 B1 | 11/2019 | Jorgovanovic et al. | |
| 10,764,677 B2 * | 9/2020 | Paré | H04R 25/556 |
| 11,086,593 B2 * | 8/2021 | Boesen | H04R 1/1091 |
| 2007/0047708 A1 * | 3/2007 | Boillot | H04M 3/42042 379/142.01 |
| 2009/0186668 A1 * | 7/2009 | Rahman | H04M 1/72412 455/575.2 |
| 2011/0102161 A1 * | 5/2011 | Heubel | G10L 15/22 704/275 |
| 2013/0325460 A1 * | 12/2013 | Kim | G06F 3/167 704/231 |
| 2017/0111728 A1 * | 4/2017 | Kim | H04R 1/1075 |
| 2018/0060031 A1 | 3/2018 | Boesen | |
| 2018/0122025 A1 | 5/2018 | Boesen | |
| 2021/0295835 A1 * | 9/2021 | Kim | G06F 3/167 |

* cited by examiner

VOICE INTERACTIVE SYSTEM

CROSS-REFERENCE TO RELATED APPLICATION

This application claims the benefit of priority to U.S. Provisional Patent Application No. 63/000,372, filed on Mar. 26, 2020; which is hereby incorporated by reference in its entirety.

BACKGROUND

Communication devices, such as mobile phones, include increasingly smaller chips, batteries, sensors, microphones, and speakers as miniaturization technology progresses. While such devices are increasingly more powerful and useful, their designs typically require hand-use as a mechanism for enabling most user-interactions.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
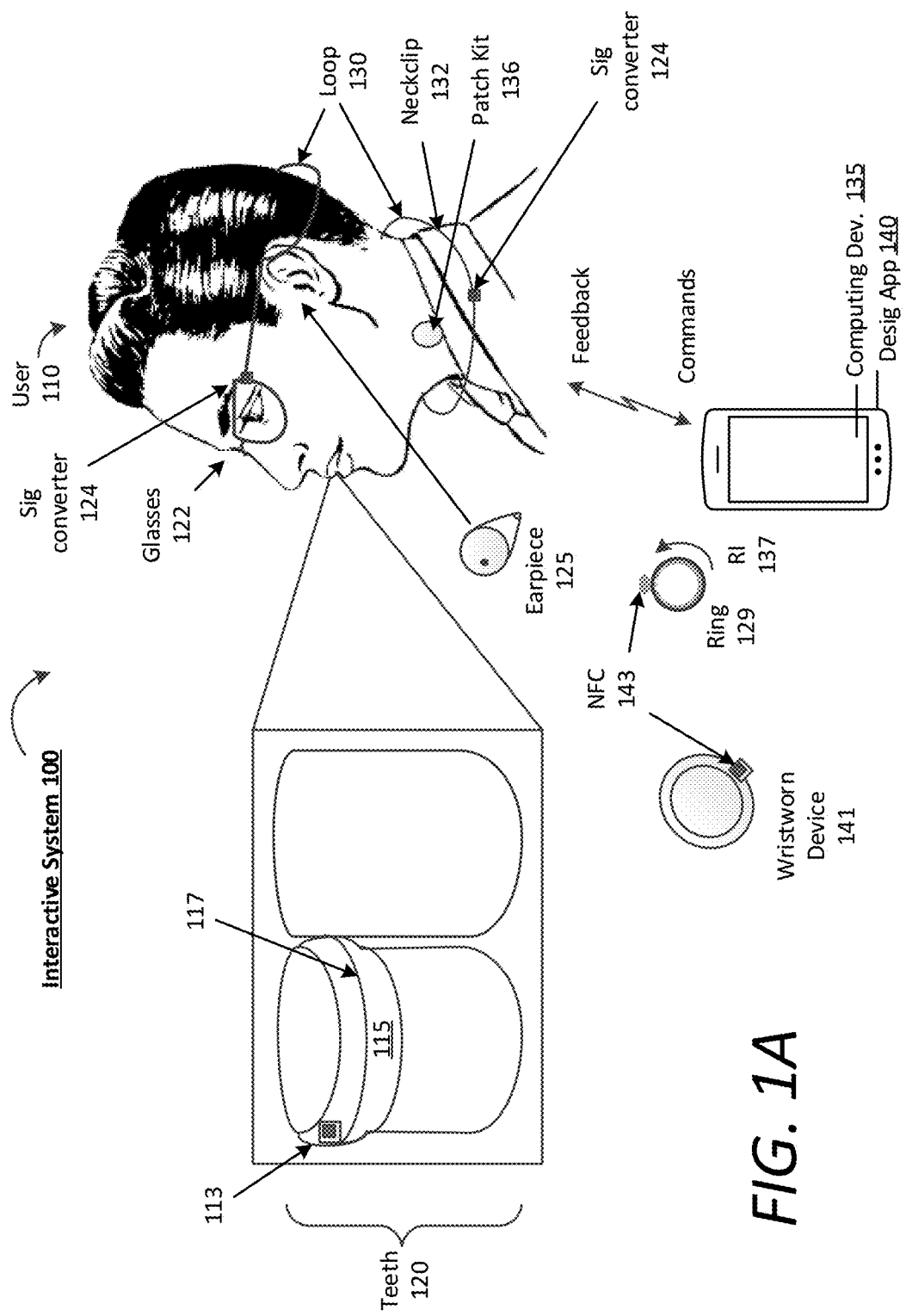
FIG. 1A illustrates an example voice interactive system implementing NFMI communications to facilitate voice interactions between the user and a mobile computing device of the user, in accordance with examples described herein.

An interactive system can implement low or zero decibel voice recognition and interaction technology and can include a plurality of devices having a variety of form factors, creating a personal area network that enables voice-based user interaction with a computing device. Among other benefits, an interactive system as described by various examples can enhance a user's ability to interact with a network-enabled device and/or online resource. In some embodiments, an example interactive system enables the user to operate a network enabled device using verbal communications, to perform tasks such as turning "on" a mobile device (e.g., smart phone) of a user, and transmitting input (e.g., user inquiries or instructions) to network resources (e.g., online agent) without the user having to handle the mobile device with his hands or view the display. In other embodiments, an example personal area network can extend network connectivity to the user, using, for example, a wireless network-enabled accessory or user-worn device that can directly connect the user with the Internet.

Still further, in some examples, the interactive system enables the user to carry out natural language interactions with a user's computing device or network resource. For example, the interactive system can enable the user to speak utterances in low volume (e.g., as whispers), and to have these utterances converted to text-based syntax, where the input can be used by device or online resources that utilize natural language and/or semantic analysis. Thus, in some examples, the user is able to speak or whisper naturally, to communicate with a natural language processing resource that interprets and carries out actions based on a user's intent.

In one implementation, the communications system can include a near-field magnetic induction (NFMI) transmission device and an NFMI receiving device worn by the user. The NFMI transmitter can comprise an intraoral device that can attach or be removably coupled to one or more teeth of a user. The intraoral device can clearly detect audio of low decibel voice inputs from the user (e.g., whispers). Additionally or alternatively, the NFMI transmitter can comprise an earpiece having a bone-conducting microphone (e.g., a piezoelectric micro-electromechanical system (MEMS) microphone) that can detect low decibel voice inputs or subvocal inputs from a user wearing the device and output the NFMI signal accordingly.

In various examples, the NFMI transmitter device of the communications system includes a small microphone (e.g., a MEMS microphone) that can detect low decibel voice inputs (e.g., whisper-level), and can include or be wirelessly paired with additional hardware (e.g., a transceiver and wireless interface) to emit NFMI signals corresponding to the voice input. The NFMI signals can be detected by, for example, a peripheral having an NFMI receiving coil. In further implementations, the interactive system can include or be wireless connected an audio output device (e.g., a MEMS speaker) worn in the user's ear. In some aspects, the audio output device can be included in an ear pod inserted into the user's external auditory canal (e.g., in a manner that is not externally visible), or a bone-conducting headset.

In variations, the microphone can comprise a bone conducting microphone that detects auditory signals through liquid and/or solid media (e.g., bone tissue, water, and/or other human tissue). In such examples, the voice input from the user can conduct auditory signals through the user's head (e.g., the mandible through the temporomandibular joint, or via the maxilla) to be detectable by the microphone. In this manner, the user may speak in a low decibel manner (e.g., whisper) or subvocal inputs (e.g., from a patch on the user's throat), which can be detected by the small microphone (e.g., included on the intraoral device, earpiece, or headset).

In various implementations, the voice input device can incorporate microtechnology comprising a miniature intra-oral device that can be inserted over or clipped onto one or more teeth of the user (e.g., via a custom dental scan). In variations, the intra-oral device can be permanently implanted in the user's oral cavity, sub-dermally, or included on a removable patch kit on the user's neck or throat (e.g., for subvocal communications). The interactive system can implement near-field magnetic induction (NFMI) to transmit auditory signals to a peripheral receiving device (e.g., included in an eyeglasses or neck collar form factor). It is contemplated that such communications means is extremely short range, and therefore the Interactive system may not be operable as a standalone device. According to examples described herein, the voice input device can be wirelessly paired with an external communications device that can detect the NFMI signals outputted by the voice input device and convert the signals to digital wireless signals (e.g., Bluetooth) that accurately reflect a detected voice input, for transmission to other communications devices (e.g., the user's smartphone).

In certain implementations, the NFMI receiving device of the interactive system comprises a conductive loop (e.g., a copper coil or wire) around the user's neck or head to detect the NFMI signals. In some examples, the loop comprises a neck worn device, or a necklace, which, for example, can be a standalone device having its own dedicated identity module (e.g., subscriber identity module (SIM)), and/or can comprise a wireless head-worn device or glasses that include the necessary loop or coil to enable NFMI signal reception. For wireless headset implementations, the headset can relay the audio signal to, for example, an application executing on a computing device of the user (e.g., a mobile smartphone). In such implementations, the head-worn or neck-worn device can be utilized to unlock the user's computing device (e.g., a lock screen of the device) using a specified voice input (e.g., voice command) and thereafter enable voice interactions with the user's computing device.

According to various examples, the interactive system can utilize an application programming interface (API) to perform unlocking and voice input recognition on a connected computing device of the user. For example, the user can carry a computing device in, for example, a pocket or purse, and can provide low decibel voice commands (e.g., whisper audio level) to a microphone of the voice input device system. These voice input can be detected by the microphone in the voice input device (e.g., an intraoral device) or earpiece of the interactive system, transmitted using NFMI to the NFMI receiving device, and then propagated to the user's computing device using one or more signal conversion means (e.g., NFMI to Bluetooth).

In certain examples, the interactive system includes a voice recognition module. The module can, for example, be included or integrated with a necklace or head-worn device that receives an initial audio transmission (e.g., via NFMI). Alternatively, the module can include logic that is distributed between multiple devices, such as between the voice input device, the worn device and/or the computing device (e.g., smart phone). The module can implement whisper and/or speech optimization logic to, for example, reduce noise, enhance the audio signal and/or convert the human speech or utterance to textual syntax. In some examples, the whisper recognition module converts low decibel voice utterances into text-based syntax that is accurate. In some examples, the whisper or speech recognition module can recognize spoken utterances as commands, or as a combination of commands and utterances. When commands are recognized, some examples enable the commands to be communicated to the device to perform operations like screen or device unlock. In variations, the interactive system can comprise a voice input detector that detects when the user's voice input (e.g., whisper) is to be processed and interpreted. In such implementations, the interactive system need not perform translation or voice recognition functions, but rather may detect that a voice input is being received, and transmit the unrecognized voice input to the user's computing device. Thereafter, the computing device (e.g., via an executing translation application) can process the voice input accordingly, or can upload the voice input to a remote server (e.g., via a Wi-Fi connection) for recognition and/or further processing.

In alternative implementations, the interactive system can be configured to continuously communicate with the user's computing device via an executing application. In this manner, the application can comprise a listening mode to wait for voice input to be received from the interactive system, and can still communicate with the necklace or head-worn device when the computing device enters a locked state. In such examples, the application can include voice recognition logic, or the application can communicate with a remote cloud service executing voice recognition logic for processing, according to various examples described herein. Moreover, the application can continuously execute without interfering with the computing device's default lock behavior. For example, the application may be launched on a user's smart phone, where it runs in listening mode without interfering with the smart phones default screen lock behavior.

It is contemplated that transmission of auditory signals via NFMI from the voice input device to the necklace or head-worn device requires very low battery power. However, the transmission of auditory signals to the ear canal from the voice input device (e.g., worn within the user's mouth) requires significantly more battery power. In certain examples, the user may complete a dental scan for fitting the subvocal communications device tightly within the user's mouth (e.g., between two or more teeth). The intraoral device can detect low decibel inputs from the user and modulate an NFMI signal corresponding to the user's voice input to the NFMI receiving device, which can include a transceiver that converts the signal to a wireless radio signal (e.g., Bluetooth) for transmission to the user's mobile computing device. It is contemplated that this configuration and the utilization of NFMI requires exceptionally low battery power.

In some examples, the NFMI transceiver can be included in an intra-oral module and can operate as a one-way transmission means of audio over NFMI to a receiving NFMI transceiver in an external peripheral (e.g., such as a necklace or eyeglasses receiving device). The receiving device can then relay the NFMI audio signal to a computing device, such as the user's smartphone. In various implementations, the receiving device can comprise a wired loop or coil and can convert the NFMI audio signal to another wireless protocol, such as Bluetooth low energy, before transmitting the signal to the computing device. Once received at the computing device, the audio signal can be processed by an application for audio signal enhancements (e.g., noise filtering, audio conditioning, signal enhancement), voice recognition where voice input is converted to text-based syntax, voice interpretation (e.g., detecting spoken commands), or any other purpose. In some aspects, the audio signal can further be relayed by the computing device to a cloud service (e.g., via Wi-Fi) for further processing.

In a further example, the microphone can be included in a patch kit, such as a disc patch comprising micro-hardware (e.g., microphone and NFMI transceiver). The patch kit can be coupled to, for example, the user's neck or throat for detecting the subvocal voice input from the user. In one aspect, the patch kit comprises a chipset that converts the voice input into an NFMI signal and propagates the NFMI signal via a transmission coil. An NFMI receiving coil (e.g., included on an external peripheral device or within the mobile computing device of the user) can detect the NFMI signal and perform at set of functions based on the voice input provided by the user.

For patch kit implementations, one or more electrodes can be included to detect subvocal voice inputs of the user, and/or may be derived from neural signals provided to the vocal and throat muscles. In such implementations, a statistical model may be used to learn the user's neural speech patterns in order to convert the neural signals into digital voice inputs and enable subvocal communications with, for example, a speech recognition personal assistance application executing on the user's computing device.

It is contemplated that the user's computing device can execute a designated application for communicating with the interactive system worn by the user. In one example, the user's computing device includes an NFMI receiving coil to detect the NFMI signals from the NFMI transmitter device. In variations, the user's mobile computing device may not include the necessary hardware for NFMI detection. In such variations, the interactive system can include an intermediary device that detects the NFMI signal, converts the NFMI signal to a wireless RF signal (e.g., Bluetooth), and transmits the wireless RF signal to the user's mobile computing device. The designated application running on the user's computing device can perform one or more types of operations (i) process the audio signal for further clarity (e.g., signal enhancement), and (ii) convert the audio signal into text-based syntax that accurately reflects the spoken utterance. The designated application can also perform additional recognition and/or processing above the recognized text-based syntax, such as identifying when the user's utterances are commands. Once the voice input is recognized, the application can implement, or initiate implementation of any number of functions, such as personal assistant functions, concierge services, checking messages, listening to audio, and the like.

The designated application on the user's computing device may provide audio feedback to the user via a signal return trip to one or more earpieces or a headset worn by the user. In one example, the application emits the audio feedback as an NFMI signal detectable by the receiving coil in the intermediary device or an NFMI receiving coil in the earpiece. In either case, the signal is converted to an audio output signal and outputted by a speaker into the user's ears or bone-conducting headset. Accordingly, the personal area network provided by the interactive system described herein can facilitate voice interactions between the user and the user's computing device using NFMI signal propagation and conversion.

As used herein, a computing device can refer to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, network equipment (e.g., routers), and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions.

Examples of non-transitory computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Interactive System

FIG. 1A illustrates an example interactive system 100 implementing near-field magnetic induction (NFMI) communications to facilitate voice interactions between the user and a mobile computing device of the user, in accordance with examples described herein. In certain implementations, the interactive system 100 can create a personal area network for the user using NFMI communications to enable the user 110 to interact with the user's computing device 135 (e.g., via an executing application 140) for a variety of functions. The interactive system 100 can include various configurations, and can include (i) a voice input device comprising an NFMI transmitter device that includes a microphone and NFMI transmission coil, (ii) a NFMI converter comprising an NFMI receiver that includes an NFMI signal detection coil, and (iii) a feedback device, such as one or more earpieces 125 worn by the user 110 for outputting audio feedback from a designated application 140 on the computing device 135.

In one example, the NFMI receiver can be included in a chipset of the user's mobile computing device 135. In such an example, the user 110 can wear a single NFMI transmitter device (e.g., an intraoral NFMI device 115 coupled to one or more teeth 120 in the user's mouth that can propagate NFMI signals based on the user's low decibel voice input, which can be detected by the NFMI receiving coil of the user's computing device 135 to facilitate voice interactions between the user 110 and the computing device 135.

However, it is contemplated that the standardization of NFMI technology within mobile computing devices may fail to transpire in the future. According to examples provided herein, the interactive system 100 may include a NFMI converter for converting the NFMI signal from the voice input device (e.g., an intraoral NFMI device 115) into a wireless signal detectable by the computing device 135 of the user 110 (e.g., a Bluetooth signal). The NFMI converter can comprise any number of form factors, and can include a NFMI coil for detecting NFMI signals produced by the voice input device 115. In one example, the NFMI converter can comprise eyeglasses worn by the user 110, with an NFMI loop or coil 130 that comprises a strap worn around the head of the user 110. In variations, the NFMI converter can comprise a loop 130 (e.g., a collar device or necklace) worn around the user's neck.

As described herein, the NFMI converter detects NFMI signals produced by the voice input device, which themselves are based on the user's voice inputs. The voice input device includes a microphone 113 (e.g., a MEMS microphone) that can detect low decibel inputs (e.g., whispers) from the user 110. The voice input device (e.g., intraoral device 115) can further include an NFMI transmitter 117 that can generate an NFMI signal based on the user's voice inputs (such as spoken utterances). The NFMI signal is then detected by the NFMI converter, which comprises a NFMI detector (e.g., a loop or coil 130) and a signal converter 124 to convert the NFMI signal into a wireless signal that can be transmitted to a designated application 140 running on the user's computing device 135. As described herein, the NFMI converter can comprise a glasses 122 form factor, a neckclip 132 form factor, a belt form factor, a ring form factor, or other accessory or user-wearable type devices.

Further, the type of functionality and/or interface provided with NFMI converter 165 can be specific to the device's form factor. For example, the ring 129 can comprise a rotation interface 137 that enables the user to rotate an outer halo device comprising a rotational bearing on the ring 129 to, for example, enable the user 110 to scroll through menu items, as discussed in detail below. In further implementations, the ring form factor 129 or wrist-worn device form factor 141 can include additional analog or digital input interfaces (e.g., buttons, feedback mechanisms, a microphone, capacitive touch and/or slide sensors, audio, lights, haptic response mechanism, etc.) that can be programmed to provide an intuitive user experience through vocal or subvocal communications. For example, the user 110 can make menu selections by squeezing the ring 129 or wrist-worn device 141 or by providing a touch input a touch-sensitive portion. In certain examples, the user 110 can communicate through tap inputs provided on the touch-sensitive portion (e.g., via Morse code or other touch-based language).

In still further implementations, the ring 129 or wrist-worn device 141 can include a haptic feedback mechanism for providing vibrational inputs to the user 110. Such inputs can be triggered as notifications (e.g., when a messaged is received or as a confirmation input when selections are made or requested functions are executed). Additionally, haptic responses can be provided as feedback for the user 110 through bidirectional tap/haptic communications. For example, the user 110 can provide tap inputs to communicate (e.g. Morse code inputs) and can be provided haptic responses through the device as received communications.

Additionally or alternatively, the ring 129 and/or wrist-worn device 141 can include a near-filed communication (NFC) interface 143 for performing various automatic functions with other NFC interfaces. For example, the NFC interface 143 can be configurable through an application executing on the computing device 135 or automatically based on secure element identification to, for example, perform secure payments, unlock a door or vehicle, transferring or exchanging data, triggering other functions on a paired device, or performing other general interactions.

Furthermore, it is contemplated that multiple rings 129 and/or wrist-worn devices 141 may be worn and programmed for different functions. For example, the user 110 may use a dedicated ring 129 or wrist-worn device 141 specifically for payments, and another dedicated device for interaction with the user's smart home devices (e.g., to trigger a door locking mechanism). Still further, the rings 129 and/or wrist-worn devices 141 may include other feedback mechanisms, such as notification lights, an audio output device a heat output mechanism, a squeezing mechanism or pressure tab on the inner circumference of the ring 129 or wrist-worn device 141 for providing feedback.

Additionally, the ring 129 or wrist-worn device 141 can include one or more additional sensors for medical or activity monitoring. For example, the ring 129 or wrist-worn device 141 can include a blood pressure and/or blood oxygen sensor, an accelerometer or IMU (e.g., for step counting), temperature sensor, and the like. In certain implementations, such medical or activity sensors may be used for exercise tracking and progress applications or to supplement the user's medical information.

In additional implementations, the ring 129 or wrist-worn device 141 can include sub-selection input mechanisms for turning the device on or off. For example, a slide sensor or inertial measurement unit (IMU) can be included to detect when the user 110 puts the device on or takes the device off. Upon detection, the ring 129 or wrist-worn device 141 can function to automatically turn on or off and, for example, automatically establish a communication link with the user's computing device 135 through the NFMI link and intermediary device.

Irrespective of the form factor, the NFMI converter 165 includes a signal converter 124 that transmits the converted wireless signal to the computing device 135 of the user, which can execute a designated application 140 specifically for vocal interactions. In some aspects, the designated application 196 can comprise a virtual assistance app (e.g., utilizing artificial intelligence) to receive the wireless signals as recognized voice input (e.g., text-based syntax or interpreted commands) and perform personal assistance functions on the user's computing device 135. Such functions can involve interacting with other applications on the computing device 135, such as booking travel plans on a travel or concierge app, making a phone call, sending text messages via one or more messaging apps, listening to content (e.g., an e-book or music), checking financial records via a finance app, and the like.

Accordingly, in variations, the designated application 140 can receive (i) an audio signal that substantially reflects the voice utterance of the user, with or without filtering and acoustic enhancement; or (ii) text-based syntax that is based on a conversion of the captured utterance. The designated application 140 can perform, for example, the desired assistance functions. As an addition or alternative, the designated application 140 can communicate with an online resource (e.g., artificial intelligence chat agent) to assist the user with the desired assistance functions. In either example, the designated application 140 can provide feedback to the user 110. The feedback can be generated from a speaker of the computing device 135 and outputted as audio or can be transmitted as a wireless signal (e.g., Bluetooth) to one or more paired earpieces 125 worn by the user 110. Accordingly, the user 110 can interact in a low decibel manner with the designated application 140 without having to physically handle the computing device 135. For example, the user can interact with the designated application without touching or viewing the computing device 135. To further the example, the user can interact with the computing device 135 without taking the computing device 135 from the user's pocket, and over the course of a duration in which the device turns "off" (e.g., lock-screen) at multiple instances.

Figure 1B:
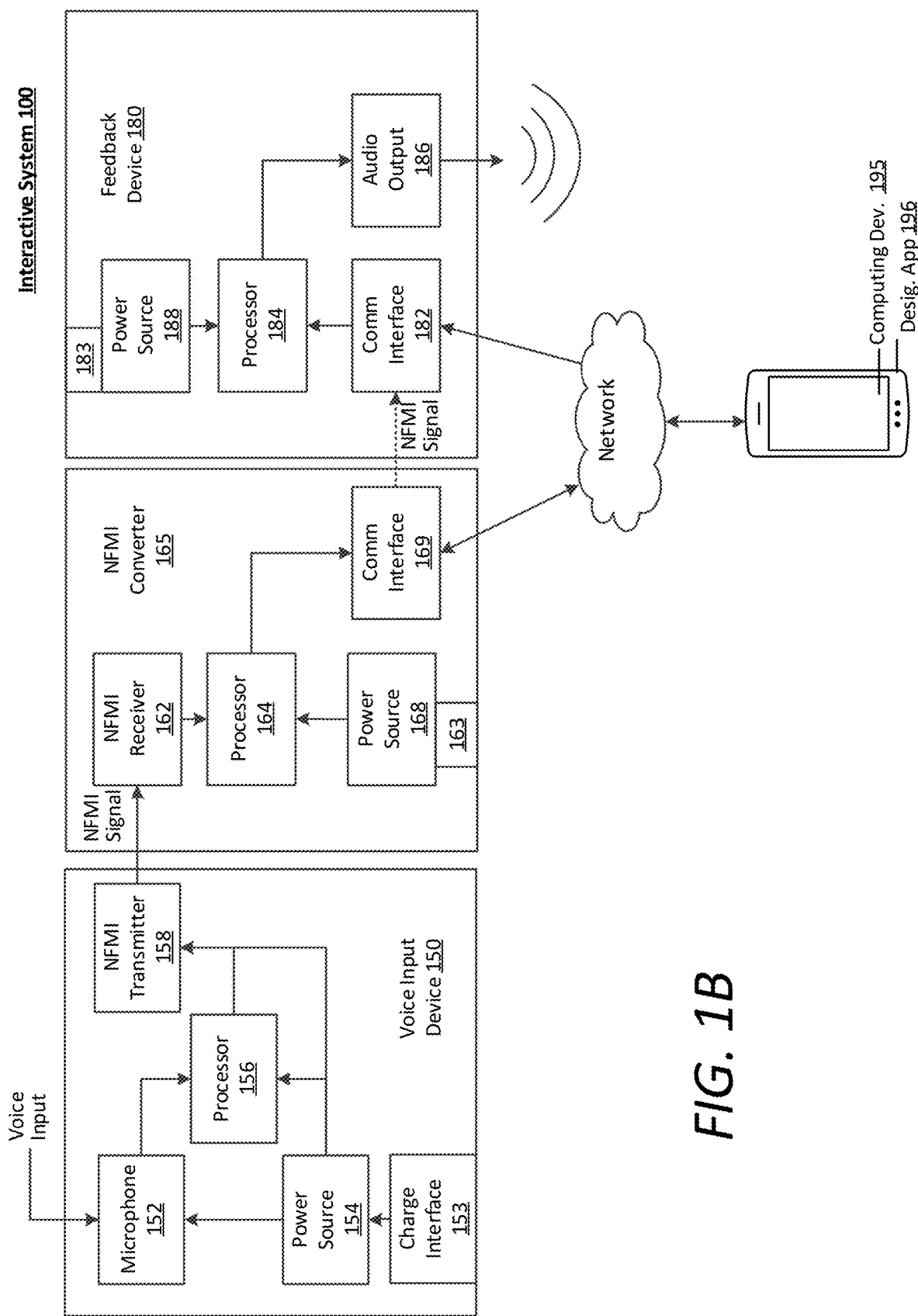
FIG. 1B is a block diagram illustrating an example interactive system in operation, according to examples described herein.

FIG. 1B is a block diagram illustrating an example interactive system 100 in operation, according to examples described herein. As described above, the interactive system 100 can include a voice input device 150 (e.g., an intraoral device comprising a food grade enclosure and coupled to the user's teeth 120), an NFMI converter 165 (e.g., a neck clip device 132 or glasses 122 comprising an NFMI detection loop 130), and a feedback device 180 (e.g., one or more earpieces 125 or bone-conducting headset). The voice input device 150 can include a small microphone 152, a processor 156, a power source 154, and an NFMI transmitter 158 comprising a coil that modulates a magnetic field based on voice inputs provided into the microphone 152. The microphone 152 can comprise a MEMS microphone, or a bone-conducting microphone depending on the form factor of the voice input device 150. For bone-conducting microphone implementations, the voice input device 150 can be included in the earpiece 125 worn by the user 110, and therefore can be combined with the feedback device 180.

As described herein, the voice input is detected by the microphone 152 can converted into a digital signal. In some examples, the voice input device 150 includes a processor 156 to condition the signal to be outputted by the NFMI transmitter 158. In various examples, the NFMI transmitter 158 comprises a conductive coil that generates and modulates a localized magnetic field based on the voice input. The NFMI transmitter 158 can have a range of two to three meters and requires very low power. Accordingly, the power source 154 can comprise a miniaturized micro-battery, such as a flexible piezoelectric battery and charger combination, or a flexible, rechargeable lithium ion polymer battery. In various examples, the voice input device 150 can further include a charge interface 153, such as an induction coil, to enable wireless charging of the power source 154.

The NFMI signal is propagated or emitted by the NFMI transmitter 158 and detected by an NFMI receiver 162 of the NFMI converter 165. As described herein, the NFMI converter 165 can comprise any number of form factors, such as eyeglasses 122, a neck-clip 132, etc. The NFMI receiver 162 can comprise a receiver coil that detects the modulated magnetic field generated by the NFMI transmitter 158. In one aspect, the eye rim of the glasses 122 can include the NFMI coil. In variations, the NFMI coil can be wrapped around the user's head (e.g., within a strap). In various examples, the NFMI converter 165 also includes a processor 164, power source 168, and communication interface 169. The power source 168 can comprise a miniaturized battery, such as one or more of the batteries described in connection with the voice input device 150.

In further variations, the NFMI receiver(s) may be included on the handles of the glasses 122 (e.g., a coil wrapped around the handle). In such an example, the loop 130 or strap that wraps around the user's head may not be needed. Furthermore, the glasses 122 may further be integrated with bone-conducting headphones to provide audio feedback to the user 110.

The processor 164 processes the NFMI signal detected by the NFMI receiver 162 and can output a digital signal to the communication interface 169 for transmission. For example, the processor 164 and communication interface 169 can convert the NFMI signal into a wireless radio frequency (RF) signal (e.g., Bluetooth, BLE, Wi-Fi, Zigbee, DECT, etc.) for transmission to the computing device 195 of the user 110. In variations, the processor 164 and communication interface 169 can utilize a different communication protocol detectable by the computing device 195, such as infrared, visible light, or microwave transmission.

As described herein, the RF signal (or other signal) produced by the NFMI converter 165 can be detected by the designated application 196 executing on the computing device 195 of the user 110. The RF signal can correspond directly to the voice input provided by the user 110 and detected by the voice input device 150. In various examples, the designated application 196 comprises a virtual assistance application that enables the user 110 to interact with the computing device 195 using voice utterances. In the example shown in FIG. 1B, the voice utterances can comprise extremely low decibel inputs (e.g., whisper level) that are not detectable by a microphone of the user's computing device 195.

The system 100 can further comprise a feedback device 180, such as an earpiece 125 that can be inserted into the ear canal of the user 110. The feedback device 180 can include a communication interface 182 to receive feedback responses from the designated application 196 executing on the computing device 195. The feedback responses can comprise wireless signals (e.g., Wi-Fi, Bluetooth, BLE, etc.) from the computing device 195, and can be received by the communication interface 182 (e.g., an antenna) of the feedback device 180. The feedback device 180 can further include a power source 188, a processor 184, and audio output device 186 (e.g., a miniature speaker). The processor 184 can receive the feedback signal from the designated application 196 and generate an audio signal for output. In various examples, the audio signal can comprise a virtual voice and can be outputted by the speaker 186 into the user's ear.

In variations, audio output device 186 of the feedback device 180 can comprise bone-conducting headphones, and can transmit sound through the user's skull as opposed to the inner ear. In such an example, the NFMI converter 165 can be combined with the feedback device 180 such that the eyeglasses form factor can include bone-conducting headphones thereon.

It is contemplated that each of the voice input device 150, NFMI converter 165, and the feedback device 180 can include wireless charging capabilities. As such, each can include a charge interface 153, 163, 183 comprising an induction coil that allows the user to recharge the respective devices by placing them on a corresponding induction charger. In certain variations, one or more of the voice input device 150, the NFMI converter 165, or the feedback device 180 can include a piezoelectric generator coupled to the power source for recharging. For example, the voice input device 150 can comprise an intraoral form factor than provides the necessary movement, pressure, and/or flexing to provide a charging current for the power source 154.

Usage Scenarios and Implementations

In certain aspects, the interactive system 100 can enable the user 110 to generate voice input for use with a search engine, artificial intelligence (AI) concierge agent or other information-based resource, for purposes of information retrieval, issue resolution, task completion or other functions. In some examples, the interactive system 100 can enable a user to generate a voice input that is interpretable as a query or command. As described with some examples, the interactive system 100 can enable a user to voice spoken input (e.g., naturally spoken word at low decibel) for a mobile device, without the user having to manipulate or handle the device (e.g., user does not have to bypass lock screen). Further, in some examples, the voice input can be signaled to a designated application 196 running on the user's mobile device, in order to cause the mobile device to perform operations that include forwarding voice input (processed or unprocessed) or voice-recognized text input (e.g., natural language query, search terms, commands, etc.) to an online site (e.g., search engine, AI agent, etc.). By way of example, the interactive system 100 can generate voice input that is processed and forwarded to an online concierge service. The concierge service can provide information and perform tasks for the user in connection with one or more types of services, such as, for example, travel bookings (e.g., airline, lodging and vehicle reservations) and dinner reservations. Additionally or alternatively, the designated application 196 can be linked to search history and/or financial data of the user 110, and can provide predictive and/or highly personalized services with regard to personal assistance, targeted content, product suggestions, and the like.

In still further aspects, one of the interfaces 153, 163, 183 of the interactive system 100 can comprise a near-field communication (NFC) interface that the user can utilize to, for example, make single touch payments using a wrist worn form factor 141, or the ring 129 form factor described herein. In such an example, the ring 129 or wristband 141 can link with a payment application on the user's computing device 195 (either directly or through the NFMI communications). The user may provide a voice input, such as "payment," which can automatically cause the payment application to be launched on the computing device 195 and enable the single tap payment function via the ring 129 or wristband 141.

It is contemplated that NFMI communications is limited in interactivity with widely used communications hardware (e.g., those included in mobile computing devices). For example, NFMI currently communicates using I²C digital audio. Accordingly, the voice input device 150 may further include the necessary hardware, such as additional digital-to-analog and/or analog-to-digital converters, to enable the communications between the devices.

It is further contemplated that any of the voice input device 150, the NFMI converter 165, and the feedback device 180 may be combined with each other such that two or more of the devices 150, 165, 180 may be included in the same form factor. For example, the voice input device 150 may be combined with the feedback device 180 such that the microphone 152 and audio output 186 are included in one earpiece or bone-conducting headset form factor. In such an example, the microphone 152 can comprise a bone-conducting microphone that can detect lower decibel voice inputs through audio conductivity through the mandible or maxilla of the user.

In still further examples, the microphone 152, audio output device 186, and one or more components of the NFMI converter 165 may be included in a single form factor. For example, the microphone 152, audio output device 186, and a Bluetooth or BLE chip may be included in a single form factor (e.g., an eyeglasses form factor) for communicating and interacting with the computing device 195

In still further examples, one or more of the devices 150, 165, 180 of the interactive system 100 can be included in a ring 129 or wristband form factor 141 that may be worn on one or more of the user's fingers. In such examples, the ring 129 form factor can interact with the designated application 196 on the computing device 195 to perform additional functions, such as linking with a payment application and/or account of the user and enabling touch payments using the ring 129 or wristband 141 (e.g., via a near field communication (NFC) chip or RFID chip).

Other forms of crossover functionality are also contemplated. For example, the selected form factor (e.g., eyeglasses 122, ring 129, wristband 141, neck clip 132, etc.) can be utilized to perform two-factor authentication through the designated application 196. As a voice assistance application, the user can interact with the application 196, which in certain circumstances will ask for two-factor authentication. In one example, the ring 129 can communicate with the feedback device 180 via the NFMI converter 165 and/or can comprise a physical touch input device (e.g., an analog or digital button) that enables the user to provide two-factor authentication through the ring 129.

In still further examples, the ring 129 can comprise the voice input device 150 and the NFMI converter 165 to enable communications with the user's computing device 195 and the feedback device 180. In such an example, the microphone 152 can be included on the ring 129 to receive the voice inputs, and the ring 129 can serve as an NFMI relay to communicate with the feedback device 180, which can convert the NFMI signal to an audio output signal that the user can hear.

In variations, the ring 129 or wristband 141 can include a rotation interface 137 that enables the user to scroll through audio menu options forwards and backwards. In one example, the ring 129 or wristband 141 can include a selection device (e.g., an analog or digital button) that enables the user to select an option from the audio menu. Accordingly, when an assistance function on the designated application 196 provides multiple options for selection by the user, the user can quickly rotate the rotation interface 137 of the ring 129 or wristband 141 to a desired option and make a selection accordingly.

Mobile Computing Device

Figure 2:
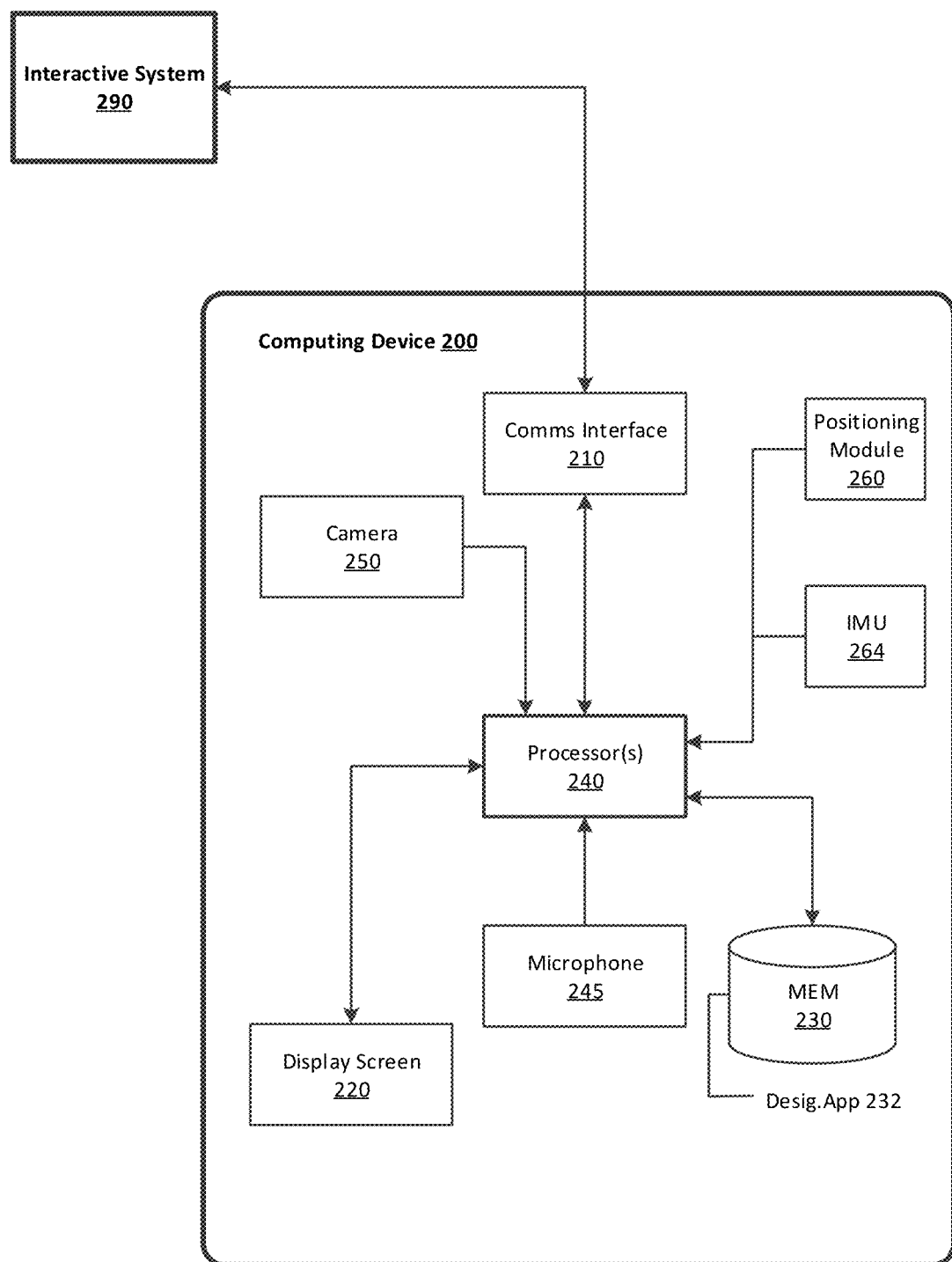
FIG. 2 is a block diagram illustrating a mobile computing device executing a designated application for communicating with the interactive system, according to various examples.

FIG. 2 is a block diagram illustrating a mobile computing device executing a designated application for communicating with the interactive system, according to various examples. In many implementations, the computing device 200 can comprise a mobile computing device, such as a smartphone, tablet computer, laptop computer, VR or AR headset device, and the like. As such, the computing device 200 can include telephony features such as a microphone 245, a camera 250, and a communication interface 210 to communicate with external entities using any number of wireless communication protocols (e.g., Wi-Fi, Bluetooth, BLE, etc.).

The computing device 200 can further include a positioning module 260 and an inertial measurement unit 264 that includes one or more accelerometers, gyroscopes, or magnetometers. In certain aspects, the computing device 200 can store a designated service application 232 in a memory 230. In variations, the memory 230 can store additional applications executable by one or more processors 240 of the computing device 200, enabling access and interaction with one or more host servers over one or more networks 280.

In accordance with examples provided herein, the processor 240 can execute the designated application 232 to communicate with the interactive system 290 described above. For example, the communications interface 210 can receive wireless signals corresponding to the user's voice inputs (e.g., utterances) from the NFMI converter 165 of the interactive system 290, which can be processed via the executing application 232. The computing device 200 may then provide feedback to the interactive system 290 accordingly to enable interactions without the user needing to interact with the display screen 220.

As described herein, the designated application 232 can comprise human-augmented artificial intelligence to facilitate the user's interactions with the computing device 200. In one example, the designated application 232 can provide travel agent and/or concierge services for the user. Additionally or alternatively, the designated application 232 can comprise a voice-to-device personal assistance service that enables the user to interact with or access other applications (e.g., newsfeed, social media, financial services, rideshare, etc.), a web browser, or internal device features (e.g., stored media content) using primarily voice inputs.

Methodology

Figure 3A:
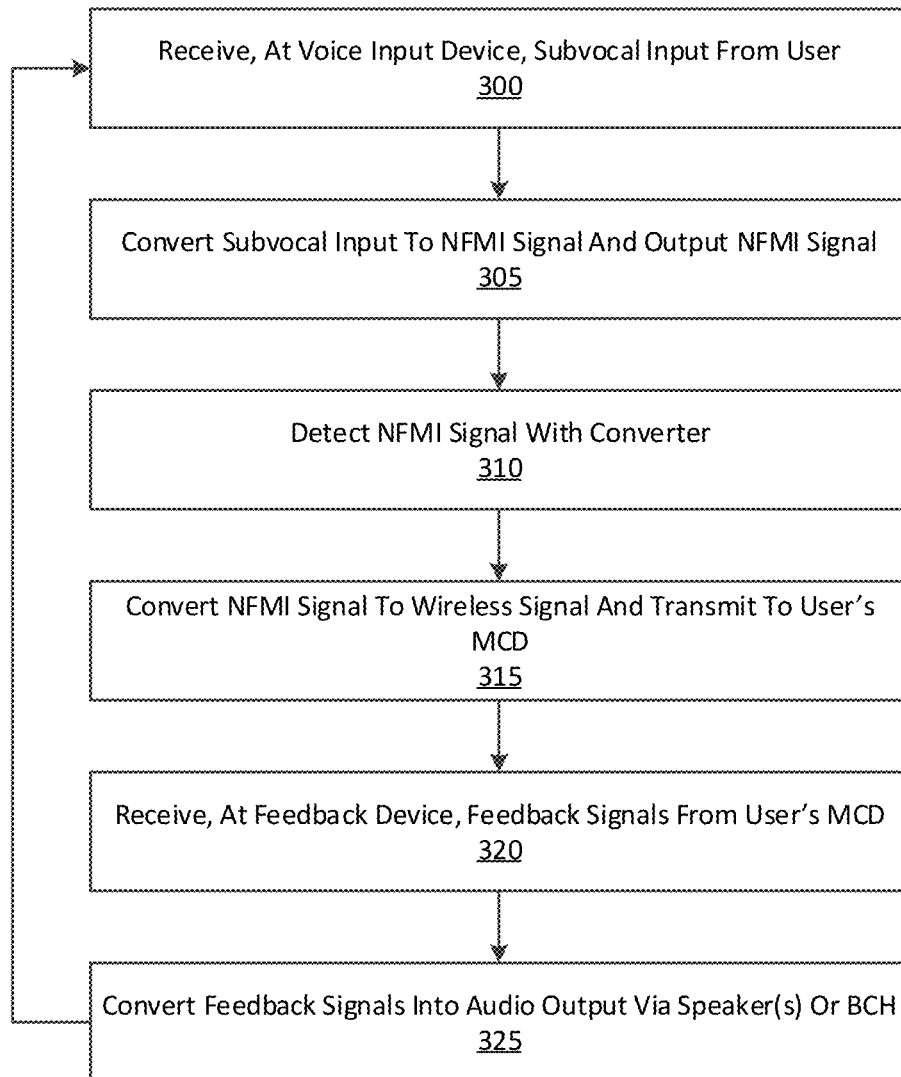
FIG. 3A is a flow chart describing an example method of implementing subvocal communications between an interactive system and a computing device of a user, according to various examples.

FIG. 3A is a flow chart describing an example method of implementing subvocal communications between an interactive system and a computing device of a user, according to various examples. In the below discussion of FIG. 3A, reference may be made to reference characters representing like features as shown and described with respect to FIGS. 1A, 1B, and 2. Furthermore, the steps described in connection with FIG. 3A may be performed by the interactive system 100 described with respect to FIGS. 1A, 1B, and 2. Referring to FIG. 3A, the voice input device 150 of the interactive system 100 can receive a subvocal input from the user 110 (300). The voice input device 150 can convert the subvocal input to an NFMI signal and output the NFMI signal (305). In various implementations, an NFMI signal converter 165 can detect the NFMI signal (310), convert the NFMI signal to a wireless signal detectable by the user's computing device 195, and transmit the signal to the user's computing device 195 (315).

In various implementations, the user's computing device 195 can execute a designated application 196 for enabling voice interactions with the computing device 195 via the interactive system 100. As such, the designated application 196 can process the wireless signals based on the user's voice input and perform a set of functions that are determined from the user's voice input. In doing so, the application 196 can provide voice feedback to the user 110, such as virtual assistance feedback. In certain examples, the feedback device 180 can receive feedback signals from the user's computing device 195 (320). Thereafter, the feedback device 180 can convert the feedback signals into audio output through one or more speakers in or a bone-conducting headset (325), and the process may be repeated accordingly.

Figure 3B:
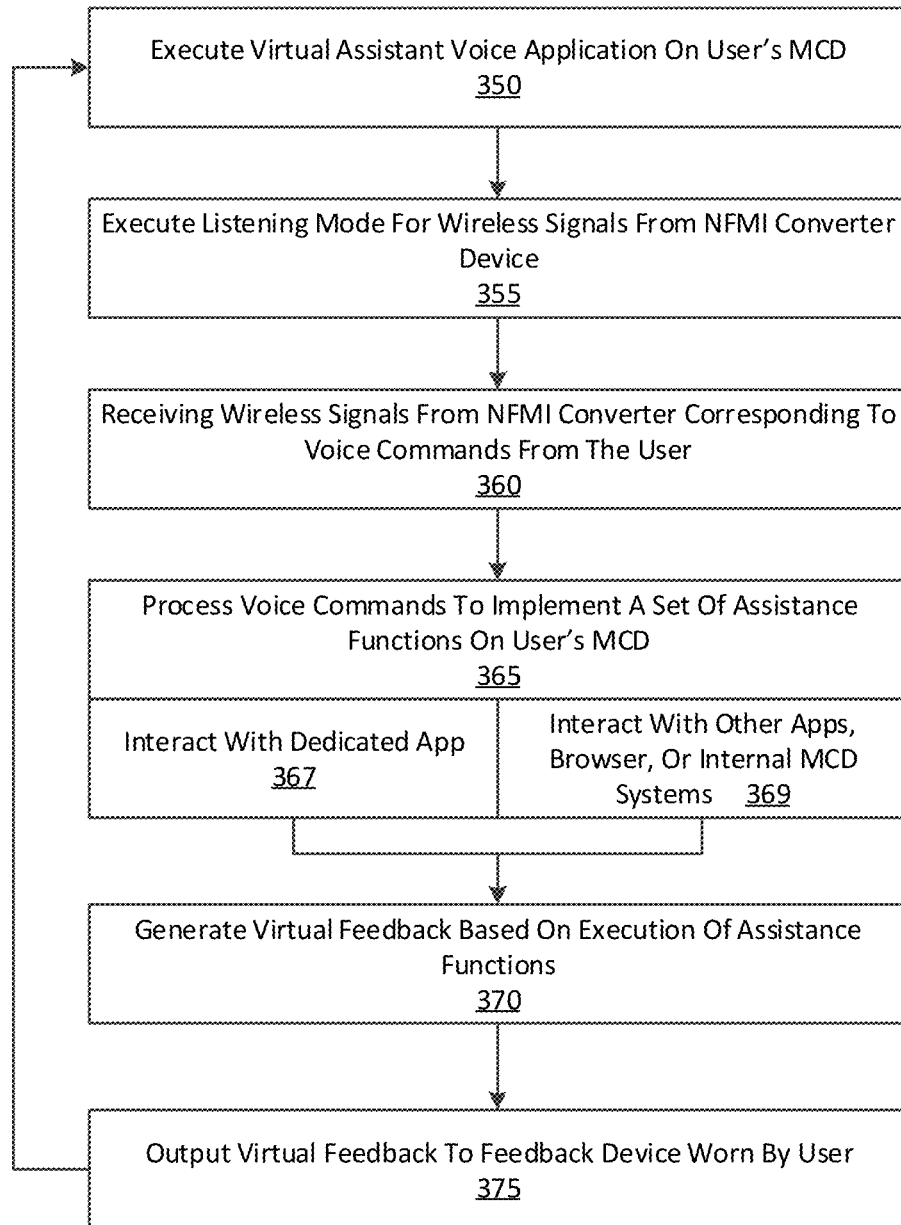
FIG. 3B is a flow chart describing an example method of executing virtual assistance functions based on voice inputs by the user, according to examples described.

FIG. 3B is a flow chart describing an example method of executing virtual assistance functions based on voice inputs by the user, according to examples described. In the below discussion of FIG. 3B, reference may be made to reference characters representing like features as shown and described with respect to FIG. 1A, 1B, or 2. Furthermore, the steps described in connection with FIG. 3B may be performed by an example computing device 200 executing a designated application 232 for communicating with an interactive system 100. Referring to FIG. 3B, the computing device 200 can execute a virtual assistance voice application (e.g., the designated application 232) (350). In certain implementations, the application 232 can execute a listening mode for wireless signals from the NFMI converter device 165 (355).

In certain implementations, the computing device 200 can receive wireless signals from an NFMI converter 165 of the interactive system 100, where the signals correspond to voice inputs provided by the user 110 (360). The computing device 200 may then process the voice inputs as commands to implement a set of assistance functions on the user's computing device 200 (365). As provided herein, these functions can include interactions with a dedicated voice assistance application 232 (e.g., a virtual personal assistance service or concierge service that provides travel, booking, itinerary, reservation, and/or organization services) (367). Additionally or alternatively, the functions can include interactions with other applications stored on the user's device 200, a browser, or internal computing device systems (e.g., stored media files) (369).

In doing so, the computing device 200 can facilitate voice interactivity with the user 110 via the interactive system 100 implementing NFMI communication technology. Furthermore, the user 110 need not hold or view the computing device 200, but rather the computing may remain in, for example, the user's purse or pocket, or can even be located remote from the user 110 (e.g., within Bluetooth range). Based on the performed functions on the computing device 200, the computing device 200 can generate virtual feedback based on execution of the requested assistance functions by the user 110 (370). Thereafter, the computing device 200 can output the virtual feedback to a feedback device 180 worn by the user 110 (e.g., a headset, glasses, earpiece, bone-conducting headphones, etc.) (375), and the process may repeat accordingly.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An interactive system comprising:
a computing device executing a virtual assistance application;
a voice input device comprising (i) a microphone to receive a voice input from a user, and (ii) a near-field magnetic induction (NFMI) transmitter to modulate a localized magnetic field based on the voice input;
an NFMI converter to (i) detect the modulated localized magnetic field, and (ii) convert the modulated localized magnetic field to transmit a wireless signal based on the voice input to the computing device of the user, the wireless signal comprising one or more commands;
wherein the virtual assistance application executing on the computing device of the user processes the one or more commands in the wireless signal, as converted from the localized magnetic field, to perform a set of assistance functions on the computing device; and
a feedback device comprising an audio output device, the feedback device to receive feedback signals from the virtual assistance application executing on the computing device of the user and output audio signals to the user using the audio output device based on the feedback signals.

2. The interactive system of claim 1, wherein the feedback signals are based on the one or more commands provided in the voice input from the user.

3. The interactive system of claim 1, wherein the audio output device comprises one or more earpieces worn by the user.

4. The interactive system of claim 1, wherein the voice input device comprises an intraoral device worn within the mouth of the user.

5. The interactive system of claim 1, wherein the microphone comprises a micro-electromechanical system (MEMS) microphone.

6. The interactive system of claim 1, wherein the microphone comprises a bone-conducting microphone.

7. The interactive system of claim 1, wherein the NFMI converter comprises an eyeglasses form factor.

8. The interactive system of claim 1, wherein the NFMI converter comprises a neck-worn device.

9. The interactive system of claim 1, wherein the NFMI converter and the feedback device are included in a same peripheral device.

10. The interactive system of claim 9, wherein the same peripheral device comprises a head-worn form factor.

11. The interactive system of claim 10, wherein the head-worn form factor comprises bone-conducting headphones as the audio output device.

12. A non-transitory computer-readable medium storing instructions that, when executed by one or more processors, cause the one or more processors to:
   receive a voice input from a user via a voice input device comprising a microphone;
   modulate a localized magnetic field based on the voice input using a near-field magnetic induction (NFMI) transmitter;
   detect the modulated localized magnetic field using an NFMI converter;
   convert the modulated localized magnetic field to transmit, using the NFMI transmitter, a wireless signal based on the voice input to a computing device of the user, the wireless signal comprising one or more commands;
   process, by a virtual assistance application executing on the computing device of the user, the one or more commands in the wireless signal, as converted from the localized magnetic field, to perform a set of assistance functions on the computing device;
   receive feedback signals, using a feedback device comprising an audio output device, from the virtual assistance application executing on the computing device of the user; and
   output, using the audio device, audio signals to the user based on the feedback signals.

13. The non-transitory computer-readable medium of claim 12, wherein the feedback signals are based on the one or more commands provided in the voice input from the user.

14. The non-transitory computer-readable medium of claim 12, wherein the audio output device comprises one or more earpieces worn by the user.

15. The non-transitory computer-readable medium of claim 12, wherein the detected voice input is detected from an intraoral device worn within the mouth of the user.

16. The non-transitory computer-readable medium of claim 15, wherein the intraoral device comprises a micro-electromechanical system (MEMS) microphone.

17. The non-transitory computer-readable medium of claim 15, wherein the intraoral device comprises a bone-conducting microphone.

18. The non-transitory computer-readable medium of claim 12, wherein the NFMI converter comprises an eyeglasses form factor.

19. The communication system of claim 12, wherein the NFMI converter comprises a neck-worn device.

20. A computer-implemented method of performing communications, the method being performed by one or more processors and comprising:
   receiving a voice input from a user via a voice input device comprising a microphone;
   modulating a localized magnetic field based on the voice input using a near-field magnetic induction (NFMI) transmitter;
   detecting the modulated localized magnetic field using an NFMI converter;
   converting the modulated localized magnetic field to transmit, using the NFMI transmitter, a wireless signal based on the voice input to a computing device of the user, the wireless signal comprising one or more commands;
   processing, by a virtual assistance application executing on the computing device of the user, the one or more commands, as converted from the localized magnetic field, to perform a set of assistance functions on the computing device;
   receiving feedback signals, using a feedback device comprising an audio output device, from the virtual assistance application executing on the computing device of the user; and
   outputting, using the audio device, audio signals to the user based on the feedback signals.

* * * * *